Jan. 15, 1963       W. R. SMITH-VANIZ, JR       3,074,012
                INDUCTANCE CONTROL APPARATUS
Original Filed Aug. 16, 1954                    3 Sheets-Sheet 1

INVENTOR.
WILLIAM R. SMITH-VANIZ, JR.
BY
Curtis, Morris & Safford.
ATTORNEYS

Jan. 15, 1963     W. R. SMITH-VANIZ, JR     3,074,012
INDUCTANCE CONTROL APPARATUS
Original Filed Aug. 16, 1954     3 Sheets-Sheet 2
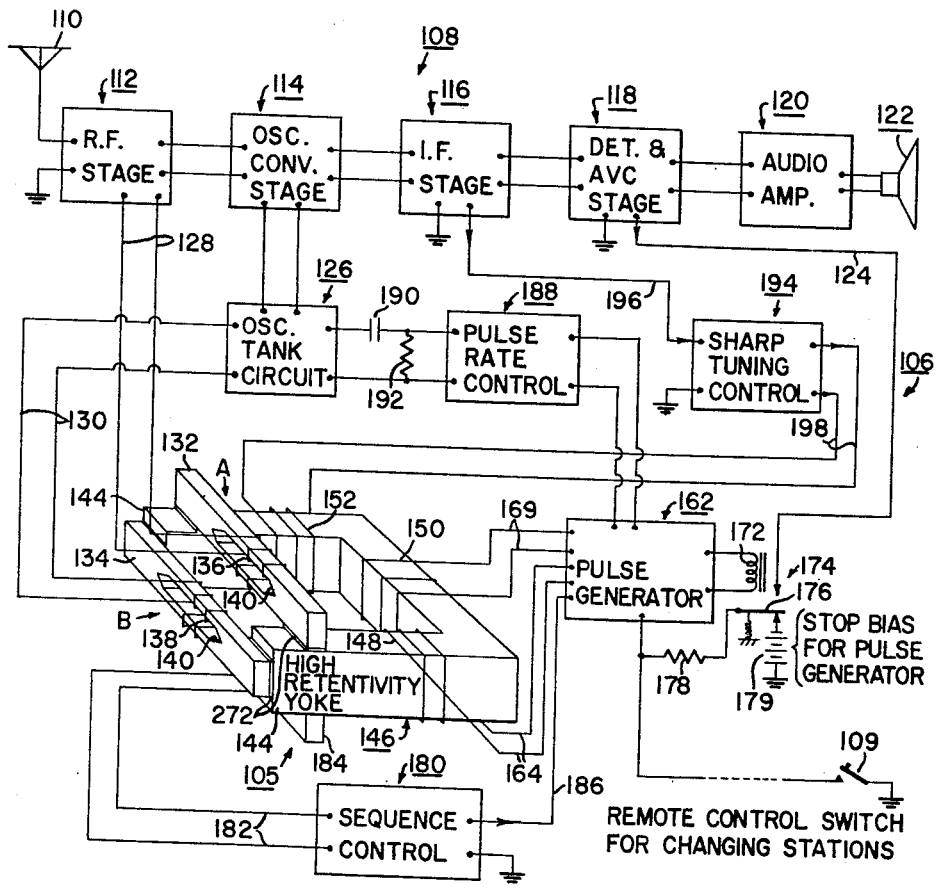
Fig. 3.
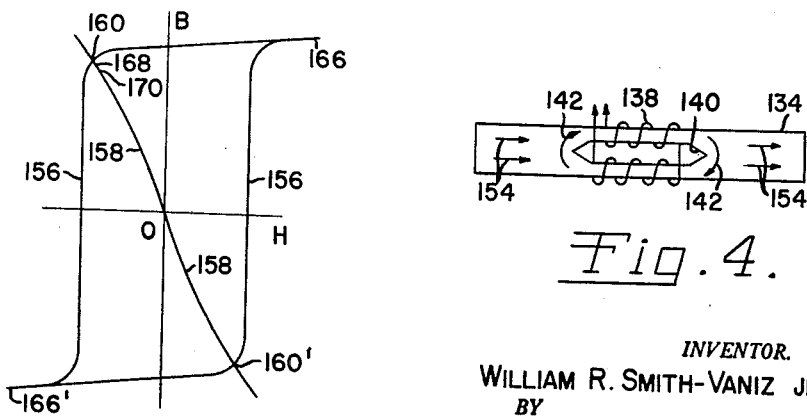
Fig. 7.
Fig. 4.
*INVENTOR.*
WILLIAM R. SMITH-VANIZ JR.
BY
Curtis, Morris & Safford.
ATTORNEYS

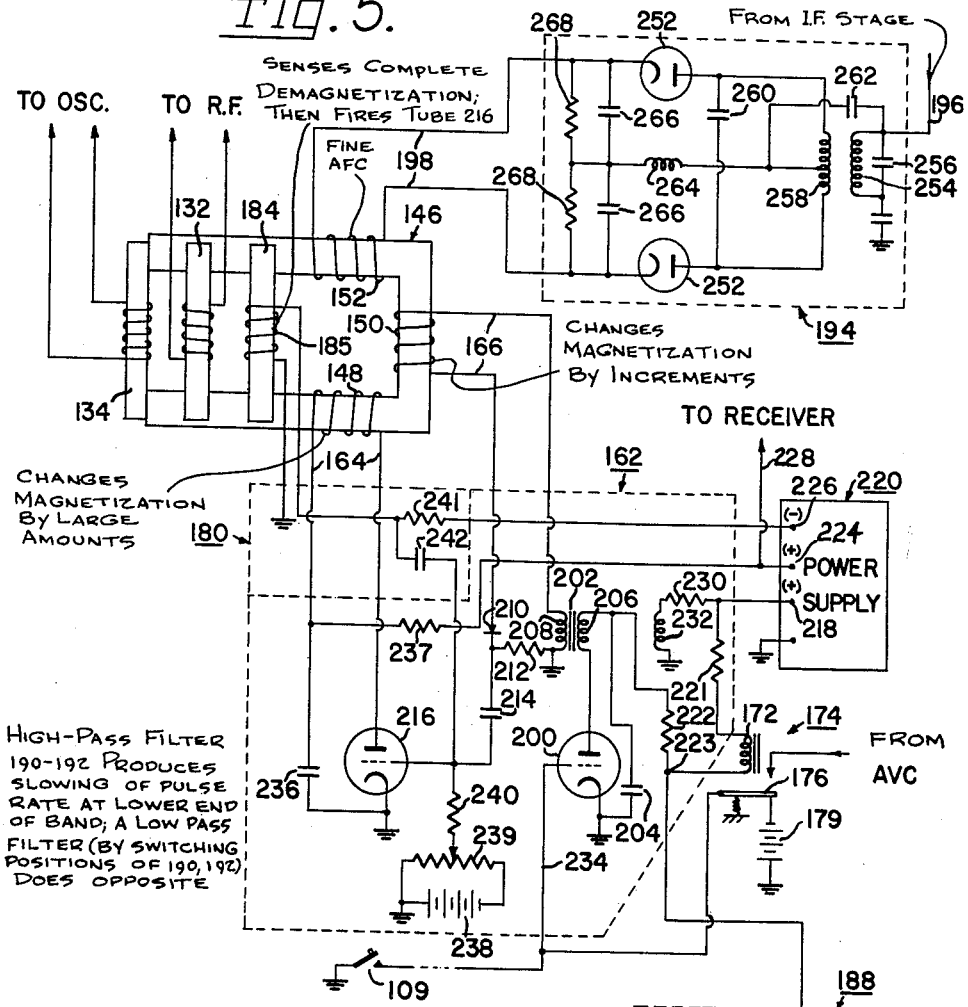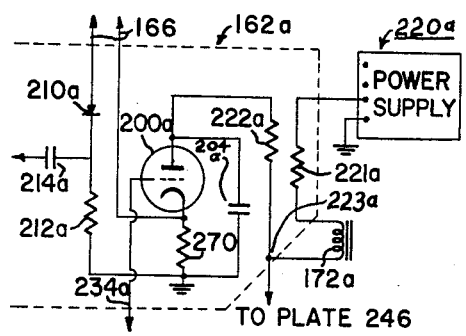

3,074,012
INDUCTANCE CONTROL APPARATUS
William R. Smith-Vaniz, Jr., Norwalk, Conn., assignor to Trak Electronics Company, Inc., Wilton, Conn., a corporation of Connecticut
Original application Aug. 16, 1954, Ser. No. 449,881, now Patent No. 2,897,352, dated July 28, 1959. Divided and this application May 23, 1958, Ser. No. 738,910
7 Claims. (Cl. 323—89)

The present invention relates to electrically-controllable inductors and to control apparatus using such controllable inductors. More particularly the invention relates to controllable inductors in which the effective inductance of a winding is controlled by controlling the residual magnetism retained by the core material.

Controllable inductors generally operate on the principle of the saturable reactor but are capable of operation at substantially higher frequencies. In one form of controllable inductor, a closed core of saturable ferromagnetic material carries a control winding and one or more signal windings. The signal winding is connected into the controlled circuit and the control winding is connected to a source of direct control current. When the control current has zero value, the signal winding has its maximum effective inductance; as the magnitude of the control current is increased, with resulting increase in the magnetic saturation of the core, the effective inductance of the signal winding decreases. Thus, a direct current can be used to control the inductance of the signal winding and can thus control the operation of resonant circuits, filters, delay circuits, etc., coupled to the signal windings. For example, such inductors provide a convenient means for rapidly sweeping tuning circuits over relatively wide frequency ranges and for remote control of electronic apparatus such as radio receivers.

It is apparent, however, that the control current must be maintained steadily at the desired value in order to hold the inductance of the signal winding at the selected value. In some types of operation, this continued current drain is undesirable and it would be advantageous to be able to adjust the inductor to a desired value of inductance and have it maintain this value without the necessity for a continuing control current.

In the conventional controllable inductors already in use, the cores have been selected from the softest magnetic materials available which have the other necessary properties such as low loss, high permeability, etc. By "soft" magnetic materials is meant material which has a low value of magnetic retentivity. The reason for this is clear: when the control current is reduced to its minimum value or to zero, it is desired that the signal winding have the maximum possible value of inductance. Any residual magnetism retained by the core, reduces this value of inductance and thus reduces the operating range of the inductor.

In the present invention, however, this property of residual magnetism, which was previously considered to be undesirable and therefore to be avoided so far as possible, is used in a positive manner with the result that it is no longer necessary to maintain continuous control current in order to maintain the inductance of the signal winding at a desired value.

Thus, "harder" magnetic materials, that is materials having greater magnetic retentivity are purposely selected, so that the control current can be utilized to set the level of the magnetic saturation of the core and then can be interrupted with the signal winding continuing to have the desired inductance value until current is again applied to the control winding. The hardness of the magnetic material will be selected so as to provide the desired operating range. It has been found advantageous to select a magnetic material capable of retaining sufficient residual magnetism to reduce the inductance of the signal winding at least to one-eighth the value which it has when the core is substantially demagnetized.

It does not always happen that magnetic materials having the desired characteristics with respect to losses, permeability, and the like, have the desired properties of magnetic retentivity. Both properties can be achieved in a controllable inductor, however, by forming the core from two different kinds of magnetic material arranged to form different portions of the flux path. For example, one portion of the core, arranged to carry the signal winding, may be formed of magnetically "soft" ferrite materials and the remainder of the core may be formed of iron, the iron being selected to have sufficient magnetic retentivity to provide the desired inductance range. Thus, the ferrite can be selected to meet the particular requirements for Q, permeability, temperature coefficient, etc., but need not have any particular magnetic retentivity as the flux will be provided by the residual magnetism of the iron.

The type of control current to be used will depend upon the particular application of the inductor. For example, in some applications a direct control current adjustable either continuously or in increments can be used to "set" the level of magnetic saturation. However, an improved control system useful in most applications will be described below in which the control current is supplied in the form of successive pulses which incrementally change the magnetic state of the core until the desired inductance value is attained.

During the application of each control pulse the inductance values are shifted by a slight amount and when each control pulse ceases the inductance values remain constant until the next control pulse is applied. Whenever a desired inductance value is reached, the control pulses are stopped, and this particular inductance value remains fixed until the control pulses are again applied. When the inductance value reaches a limit of the desired range, a large pulse can be applied to shift the magnetic condition of the control core portion back to an initial value, or the polarity of the pulses can be reversed and the magnetism changed in incremental steps in the opposite direction.

The invention can be applied to radio receivers. Such receivers can be controlled remotely without the necessity for any mechanical linkage between the receiver and the remotely-positioned tuner.

Among the many advantages of the inductance control apparatus described are those resulting from the fact that they enable positive continuous remote control to be obtained by intermittent signals.

The various advantages and aspects of the invention will be understood from the following description, considered in conjunction with the accompanying drawings, in which:

FIGURE 3 is a schematic diagram of an automobile radio receiver and asociated control apparatus embodying the invention and shown diagrammatically and partially in block form;

FIGURE 4 is an enlarged view of a portion of the controllable inductor in the control apparatus of FIGURE 1;

FIGURE 5 is a schematic diagram showing further details of the control apparatus of FIGURE 1;

FIGURE 6 is a schematic diagram of a modified form of the control apparatus of FIGURE 3; and FIGURE 7 shows curves of relative flux values for purposes of explanation.

Figure 1:
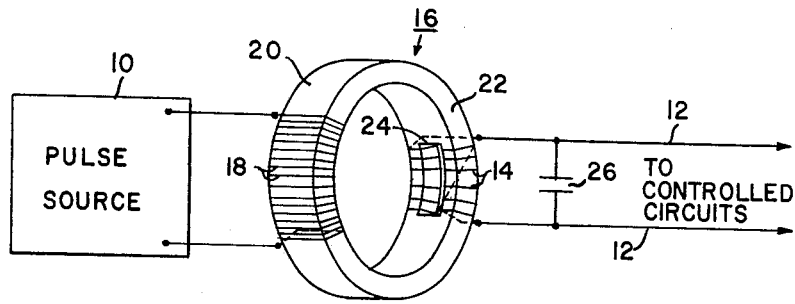
FIGURE 1 is a schematic diagram of a control circuit embodying the invention and including a controllable inductor shown diagrammatically in perspective.

In the control system shown in FIGURE 1, a pulse source 10 is used to control the operation of controlled circuits connected by a pair of leads 12 to a signal winding 14 of a controllable inductor 16. During operation, the pulse source sends series of pulses through a control winding 18 on the controllable inductor. The winding 18 includes a relatively large number of turns, and in response to the pulses it changes the degree of magnetic saturation of the inductor core 20 so as to regulate the permeability of the portion of the core 22 carrying the signal winding 14, to control its inductance.

As shown, the signal winding core portion 22 is divided by a slot 24 into two edge portions, and the signal winding is divided into two halves wound in opposite sense through the slot 24 so that the flux induced in the signal core portion 22 by any currents in the signal winding 14 closes around the slot and does not link with the winding 18. The signal winding 14 usually has relatively fewer turns than the control winding 18 and may be arranged to operate within any of a wide variety of frequency ranges, for example, such as audio, radio, or video frequencies.

During the application of each pulse the degree of magnetization of the core 20 is changed by a small step, which may be either an increase or a decrease in magnetization, depending upon the polarity of the applied pulses and the previous magnetic history of the core 20. When each pulse stops, the core 20 retains a degree of magnetization, to hold the inductance of the winding 14 at a corresponding value. This inductance value remains fixed until it is increased or decreased by an incremental amount during the next applied pulse.

The winding 14 with a shunt condenser 26 form a resonant circuit which may be used to control the operation of any circuits connected thereto. A detailed description of the operation of a similar type of control system is given hereinafter.

Preferably, the retentivity of the core 20 is such that after full magnetization it holds the inductance of the winding 14 to less than one-eighth of its inductance value when the core 20 is fully demagnetized, and, as explained in connection with the systems described hereinafter, much wider ranges of inductance may be obtained by a control system as shown in FIGURE 1.

Figure 2:
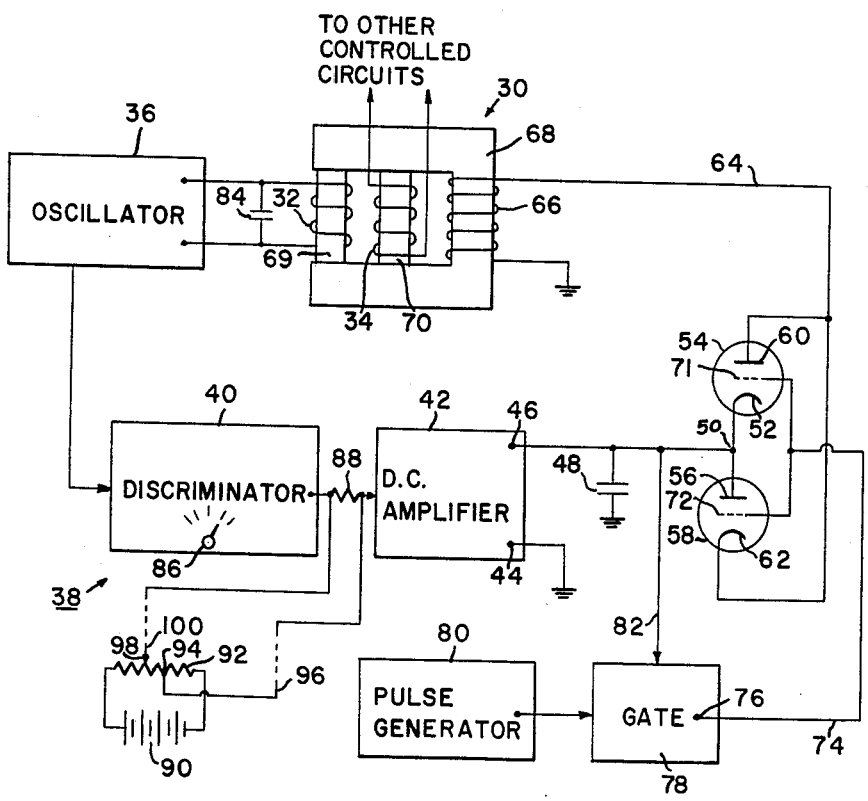
FIGURE 2 is a schematic diagram of a control circuit embodying the invention.

In the control system shown in FIGURE 2 is a controllable inductor 30 with a pair of signal windings 32 and 34. The signal winding 32 controls the frequency of an oscillator 36, for example, such as the local oscillator in a superheterodyne radio receiver, while the winding 34 regulates another circuit, for example, such as controlling the tuning of the radio frequency circuit in the same receiver. The inductance of the windings 32 and 34 is continuously controlled by a control circuit, generally indicated at 38, and including a discriminator 40 which senses the frequency of the oscillator 36. When the oscillator varies above or below the desired frequency, a corresponding positive or negative voltage, with respect to the terminal 44 connected to the common return circuit, is fed from the output terminal 46 past a filter condenser 48 to a connection 50 between the cathode 52 of a triode 54 and the plate 56 of a triode 58. The plate 60 of the triode 54 and the cathode 62 of the triode 58 are both connected by a lead 64 to a control winding 66 wound on the control core portion 68 of the controllable inductor 30.

The control core 68 is of a magnetically harder material, such as steel, formed into a yoke, with a pair of signal core portions 69 and 70 of softer magnetic material, for example such as a magnetically soft ferrite, spanned across between the legs of the yoke and carrying the signal windings 32 and 34, respectively. The control core portion 68 has sufficient retentivity to maintain the core portions 69 and 70 at a substantial degree of saturation when the current in the control winding 66 is at a low value. The desirable relationships between the magnetic characteristics of the control and signal core portions 68, and 69 and 70 will be explained further below.

The arrangement of the various parts of the inductor 30 is diagrammatically illustrated in FIGURE 2. The signal windings 32 and 34 are preferably arranged on their respective cores 69 and 70 so that the signal fluxes from these windings are substantially confined to the respective cores 69 and 70.

The grids 71 and 72 of the tubes 54 and 58, respectively, are connected together and are connected by a lead 74 to the output terminal 76 of a gate circuit 78. Electrical pulses are continuously fed from a pulse generator circuit 80 to the gate circuit 78, and the gate circuit is controlled by the output voltage from the terminal 46 which is coupled through the lead 82.

Whenever a voltage appears on the line 82, the gate circuit opens and allows the pulses from the generator 80 to drive the grids 71 and 72.

If the oscillator is above the desired frequency, a positive voltage is fed from the terminal 46 to the connection 50, putting a positive voltage on the plate 56 of the tube 58. At the same time, the gate circuit is opened so that pulses reach the grids 71 and 72. Thus, the tube 58 sends pulses of current through the control winding 66 in a first direction.

Each pulse serves to demagnetize the core portion 68 by a small step, reducing the saturation and increasing the permeability of the signal core portions 69 and 70, and correspondingly increasing the inductance of the windings 32 and 34 in a series of steps. The signal winding 32 is shunted by a condenser 84 to form a resonant tank circuit for the oscillator 36. Hence the oscillator frequency is lowered until it reaches the desired value, at which time the discriminator output has dropped to zero, and so the gate circuit 78 is closed to shut off the pulses.

If the oscillator frequency should for any reason move below the desired value, the other tube 54 conducts, sending pulses in the opposite direction through the winding 66 and incrementally increasing the magnetization of the core 68 to increase the frequency of the oscillator 36 step-by-step.

The frequency of the oscillator 36 can be manually adjusted by using a controllable reactive element in the discriminator circuit coupled to a control knob 86. Alternatively, remote control of the oscillator frequency can be provided by using a resistor 88 in the lead between the discriminator 40 and the D.-C. amplifier 42. A remotely-positioned source of voltage 90 is connected across a potentiometer 92 with a center tap 94 connected by a lead 96 to one end of the resistor 88 and with a movable contact 98 connected by a lead 100 to the other end of this resistor. Moving the contact 98, one way or the other changes the voltage applied across the resistor 88 to shift the oscillator frequency up or down.

In FIGURE 3 is shown a controllable inductor, generally indicated at 105, included in control apparatus 106, which provides fully automatic control of a superheterodyne automobile radio receiver 108. In operation, whenever someone wants to tune the receiver 108 to a different station, he presses a control switch 109 positioned at a convenient location shown as remote from the receiver and the control apparatus 106 automatically tunes the receiver to the next station having a carrier signal of sufficient strength for good reception.

The radio receiver includes an antenna 110, a radio frequency amplifier stage 112, an oscillator-converter stage 114, an intermediate frequency amplifier stage 116, a detector stage 118, an audio amplifier stage 120, and a loudspeaker 122 connected to the output of the audio amplifier. The detector stage includes a circuit for producing an automatic volume control voltage which is used to control the gain of the R-F and I-F stages 112, and 116, respectively, as is common in many superheterodyne radio receivers today. This A.V.C. voltage is also fed through a lead 124 to the control apparatus 106 to provide fully automatic control, as explained in detail hereafter. The oscillator stage 114 includes a tank circuit 126, shown separately in block form for purposes of illustration.

The frequency to which the receiver 108 is tuned is controlled by varying the inductance in a pair of tuning circuits A and B in the R-F and oscillator stages, respectively. Circuit A is connected by the leads 128 into the stage 112, for example into a tuned grid circuit in this stage to control its tuned frequency, and circuit B is connected by leads 130 into the tank circuit 126 to control the frequency of the oscillator in the stage 114. The inductance tuning circuits A and B may be identical in construction, each including signal core portions 132 and 134 with signal windings 136 and 138 coupled thereto, respectively. These signal core portions 132 and 134 are formed of bars of saturable magnetic material. The present embodiment uses ferrite material, sometimes called ferromagnetic ceramic material, for example, such as described by Snoeck in U.S. Patents Nos. 2,452,529; 2,452,530; and 2,452,531. Each bar includes an elongated hexagonal opening 140. The respective signal windings 136 and 138 are each divided into halves, as illustrated by FIGURE 4, which shows an elevational view, on enlarged scale of the signal core portion 134 and its winding 138. The halves of the windings 136 and 138 are wound in opposite sense around the spaced edge portions of the bars 132 and 134 on opposite sides of the openings 140. Thus, the ferrite bars provide signal flux paths for the signal windings which encircle the openings 140, as illustrated by the arrows 142 in FIGURE 4 indicating the signal flux path for the winding 138. The signal current in the winding 138 is alternating so that the direction of the signal flux 142 reverses during alternate half cycles.

The material of the signal core portions 132 and 134 has low loss, high "Q" characteristics and has a high initial permeability when unsaturated. This material should exhibit substantial sensitivity to changes in the degree of its saturation. Thus, as it is saturated its incremental permeability, i.e., permeability to the alternating signal flux 142 changes markedly, to vary the inductance of the winding 138.

The signal core portions 132 and 134 are bridged across between the legs 144 of a U-shaped control core or yoke portion 146 which has three control windings 148, 150 and 152 wound thereon. The control core 146 includes magnetic material having a relatively high effective degree of retentivity. Thus, when the control yoke 146 has been subjected to a large magnetizing force, for example by the flow of a large pulse of current through the winding 148, it becomes magnetized and provides a continuing magnetomotive force between its legs 144, producing a fixed control flux passing the length of the signal core portions 132 and 134, along opposite sides of the openings 140, as illustrated by the arrows 154 in FIGURE 4, producing a degree of saturation in the signal cores 132 and 134. This control flux, of course, also passes along the length of the control core portion 146 from one leg 144 to the other.

The control core portion 146 is arranged to exhibit a sufficiently high effective degree of retentivity so that when magnetized it produces a substantial degree of saturation in the signal core portions 132 and 134; so as to change the inductance of the signal windings 136 and 138 over a range of at least eight to one. In the system of FIGURE 2 the yoke 68 and the signal windings 32 and 34 and their core portions 69 and 70 may be similarly arranged and have similar relationships. I have found that good results are obtained when the control core 146 includes "square loop" ferrite material, that is, ferrite material having a broad hysteresis curve. Moreover, the control core 146 should have a moderately high coercive force so that the demagnetizing effect of the signal cores 132 and 134 in series with the control flux does not act unduly to reduce the control flux density 154 after the magnetizing pulse in winding 148 has ceased. I find it preferable to arrange the effective retentivity and coercive force of the control core portion 146, relative to the signal core portions 132 and 134 as shown in FIGURE 7.

FIGURE 7 shows a plot of the effective hysteresis or B—H curve 156, where the ordinates B are relative values of control flux density and the abscissae H are relative values of the magnetomotive force to produce the corresponding B values. FIGURE 7 also includes a curve 158 representing the negative of the normal magnetization curve for the signal cores 132 and 134. As shown, the relative values of the retentivity and coercivity of the control core 146 are such that the negative plot of the normal magnetization curve 158 for the signal cores 132 and 134 intersects curve 156 at point 160 and 160' in the region of the knee of the demagnetization portion of the curve 156. Material with a relatively broader B—H curve than curve 156, for example such as Alnico V, may be used or may be combined with lengths of soft iron. In general such materials with a very wide B—H curve are not used because the larger coercive forces involved require larger control currents.

In operation, a control pulse generator 162, indicated generally in block form, is arranged to send a large pulse of magnetizing current through a pair of leads 164 to the winding 148. This magnetizes the retentive parts of the core 146, effectively driving the control core 146 up along its B—H curve to the tip 166. When this pulse ceases, the control core 146 demagnetizes slightly, dropping back to the point 160 at the intersection with the curve 158.

At this point the control flux 154 through the signal core portions 132 and 134 is a maximum, providing the minimum values of inductance in circuits A and B and tuning the automobile receiver 108 to the top of its frequency band. For example, the receiver 108 operates in the broadcast band and has a tuning range from 530 to 1650 kilocycles, or a range of 1120 kc. The flux conditions at the point 160 on the curve 158 tune the receiver 108 to 1650 kc.

As soon as the pulse in the winding 148 has ceased, the control pulse generator 162 begins sending short voltage pulses over the leads 169 to the control winding 150. These pulses are sent at the rate of about 100 per second and are arranged to demagnetize the control core 146 in a step-by-step fashion, thus incrementally raising the inductance of circuits A and B and lowering the frequency to which the receiver is tuned. The circuits within the pulse generator 162 connected to the leads 169 have a low impedance so that as the voltage pulse starts, the current through the winding 150 starts to build up toward a large value, in effect nudging the magnetic condition of the control core 146 a short distance down along the left side of the curve 156 away from the point 160. As soon as the flux in the control core commences to change, a back voltage is created in the winding 150 which opposes the applied voltage pulse, reducing the current, and preventing any further change in the magnetic condition of the control core 146. When the first pulse in the winding 150 stops, the magnetic condition of the control core 146 moves back up a minor loop (not shown) of the curve 156 stopping at a point 168 on the curve 158 spaced down toward the origin O a slight distance from the point 160. Thus, the control flux 154 through the signal core portions 132 and 134 is decreased slightly, tuning the receiver to a frequency slightly below 1650 kc. Preferably this new frequency is spaced down about 500 to about 900 cycles below the starting point. At most the frequency increments used in tuning the receiver are about 1 kc.

The next succeeding pulse in the winding 150 shifts the magnetic condition of the control core 146 a short distance down along the new B—H curve (not shown) passing through the point 168, and when this second pulse ceases, the magnetic condition of the control core 146 shifts back up a minor loop (not shown) of this new B—H curve and stops at a point 170 spaced down a little ways from the last point 168. (The relative distances between the points 160, 168, and 170 are exaggerated for purposes of illustration.) Thus, the receiver is now tuned down another step of about 500 to 900 cycles from the starting point at the top of the band.

As explained in detail hereinafter, as long as the control generator 162 is sending pulses through the winding 150, a current flows through the solenoid 172 of a relay 174, holding the armature 176 up so that the A.V.C. voltage in the lead 124 is fed through a resistor 178 to the pulse generator 162.

The pulses continue through the winding 150, until the receiver 108 reaches the frequency of a broadcast station having a good strong carrier at the antenna 110. When the receiver is tuned to this station the A.V.C. voltage stops the pulse generator. The armature 176 is released and is pulled down to make contact with a source of stop bias 179, which holds the pulse generator 162 stopped, regardless of subsequent fluctuations in the magnitude of the A.V.C. voltage, as when the automobile passes through a tunnel. Even if the receiver 108 is turned off, it remains tuned to this first station, for the magnetic condition of the yoke 146 remains fixed.

Assuming that the driver wishes to change stations he depresses the switch 109, grounding the resistor 178 to the common ground circuit and immediately starting the pulses through the winding 150, lifting the armature 176 into contact with the lead 124 and automatically tuning to the next station down the broadcast band. Thus, the receiver automatically selects each succeeding station down the broadcast band whenever the button 109 is pushed.

When the receiver has reached a frequency at the bottom of the band, the signal and control core portions are substantially free of any control flux 154, and the operating point has reached the Origin on the curve 158. The pulse generator 162 continues to send pulses through the winding 150 so that the operating point continues moving further down along the curve 158 below the origin toward the point 160', automatically beginning tuning the receiver back up through the broadcast band.

When the receiver has again reached the top of the broadcast band, corresponding to the point 160', the control pulse generator automatically sends a large pulse through the winding 148. This pulse in winding 148 shifts the magnetic condition of the control core 146 up along the curve 156 to the point 166 and then lets it drop back to the initial point 160, so that the apparatus 106 can automatically start tuning down the broadcast band again.

In order to change the tuning sequence, a sequence control 180 may be added, connected by a pair of leads 182 to a sensing core 184 similar to the signal cores 132 and 134 and bridged across between the undersides of the legs 144 opposite the signal core 132. The core 184 and its winding 185 (FIGURE 5) are used to sense the reversal of the magnetic condition in the control core portion 146. The winding 185 may be generally similar to the windings 136 and 138 except that it may include many more turns than either of these windings.

As explained in detail in connection with FIGURE 5, when the control core 146 passes through the origin, the sequence control 180 sends a signal over the lead 186 to trigger the pulse generator 162 to energize the winding 148 and shift the magnetic condition of the control core back to point 160. Thus, with the sequence control 180 in operation, the apparatus 106 only tunes the receiver 108 down the broadcast band.

To control the pulse rate of the small sharp pulses in the winding 150, a pulse rate control circuit 188 may be included in certain applications to accelerate the pulse rate at one end of the broadcast band relative to the other end. As shown, the pulse rate control is coupled to the tank circuit 126 through a high pass filter comprising a series condenser 190 and a shunt resistor 192. This produces an acceleration of the pulse rate at the top of the broadcast band. When the positions of the resistor 192 and condenser 190 are reversed to provide a low pass filter, the pulse rate at the bottom of the broadcast band is accelerated.

In order to compensate for nearby stations which may have a very strong carrier signal such that the A.V.C. voltage reaches a sufficient value to shut off the control pulse generator 162 when the receiver is still tuned one or two frequency increments away from the dead-center position on the station, a sharp tuning control 194 may be used. The control 194 is connected by a lead 196 to the I-F stage 116 and produces a current which passes through a pair of leads 198 to the winding 152 on the control core 146. This current shifts the magnetic condition of the control core 146 so as to tune the receiver squarely on station.

In FIGURE 5 are shown the details of the control apparatus 106. The pulse generator 162 is included in the dotted area 162, with the sequence control 180 at its upper left corner. The pulse rate control circuit 188 is within the dotted area at the lower right of FIGURE 5, and the sharp tuning control 194 is in the dotted area at the top.

The small sharp voltage pulses for the winding 150 are generated by a thyratron 200 and a pulse transformer 202 and their associated circuit elements. In generating such a pulse, a condenser 204 is discharged through the thyratron 200 in series with the primary 206 of the pulse transformer 202, and a sharp voltage pulse is induced in the low impedance secondary 208 and is fed through the leads 166 to the winding 150. A rectifier 210 is included in one of the leads 166 to make the voltage applied to the winding 150 unidirectional.

A small resistor 212 is included in series with the grounded end of the secondary 208, and the voltage appearing across this resistor is coupled through a condenser 214 for the purpose of controlling a second thyratron 216, as described later.

Following discharge of the condenser 204, a current from a positive terminal 218 of a suitable power supply 220 indicated in block form begins feeding through a resistor 221, through the solenoid 172 of the relay 174 and through a resistor 222 to recharge the condenser 204. The power supply 220 may include the usual vibrator, step-up transformer and rectifier and filter circuits to provide suitable high positive voltages at the terminals 218, 224 and a large negative voltage at the terminal 226. It is to be understood that such a power supply is included in the circuits of FIGURE 3, but is omitted in order to simplify the drawing. The lead 228 from the terminal 224 feeds the power to the receiver.

While the condenser 204 is charging up, a current flows from the terminal 218 through a resistor 230 and an auxiliary winding 232 on the pulse transformer 202 to resaturate it in readiness for the generation of the next pulse.

The time constant of the resistors 221 and 222 and the condenser 204 and the voltage at the point 223 regulate the rate at which the pulses are generated. As soon as the condenser 204 has charged up to the firing voltage of the thyratron 200, it discharges again, creating another voltage pulse in the secondary 208. As long as the condenser 204 is being charged and discharged, an effectively continuous current flows through the solenoid 172 and holds up the armature 176.

When the receiver 18 is tuned to a station, the negative A.V.C. voltage fed from the lead 24 through the armature 176 and the lead 234 to the grid of the thyratron 200 biases the thyratron to prevent its firing, allowing the armature 176 to drop into contact with the stop bias source 179.

Assuming that the sequence control 180 is not included in the control circuits, the receiver is automatically tuned down the band and then back up the band, as explained above, until the operating point 160′ (FIGURE 7) is reached, representing full reverse magnetization of the control core 146.

Thereafter, the application of the next pulse produces no net change in the control flux 154. As a result, a large current flows in the leads 166 because there is now substantially no back voltage to oppose the applied voltage. This large current surge produces a large voltage across the resistor 212 which is fed through the condenser 214 to the grid of the thyratron 216 to fire it. A very large condenser 236 is discharged through the leads 164 and the winding 148 to remagnetize the core 146 to its original condition. The condenser 236 is slowly recharged from the high voltage terminal 224 through the current limiting resistor 237. The bias on the grid of the thyratron 216 is provided from a suitable source 238 with a potentiometer 239 connected across it and is fed through a resistor 240 to the grid. The bias is adjusted so that the tube 216 is fired by the desired value of voltage across the resistor 212.

When the sequence control 180 is used the winding 185 on the core 184 senses the magnetic condition of the control core 146 and triggers the thyratron 216 when the bottom of the band is reached. The winding 185 is fed a constant current from a high negative voltage terminal 226 through a large resistor 241. The current through the winding 185 is held constant because the large value of the resistance 241 in effect overrides the effect of any voltage changes induced in the winding 185. Alternatively, a large fixed inductance can be used in place of the resistor 241 to hold the current constant.

The voltage generated by the winding 185 may be defined mathematically in terms of the inductance "L" of the winding and the current "i" through it, as follows:

(1) $$E = -\frac{d}{dt}(Li)$$

Because "i" is held effectively constant, this equation can be simplified to:

(2) $$E = -i\frac{dL}{dt}$$

Now, as long as the control flux is being reduced by the series of pulses in the winding 150, the inductance value "L" increases in increments, causing negative pulses of voltage to appear across the winding 185. These negative pulses are applied through a condenser 242 to the grid of the thyratron 216 but have no effect on it.

As soon as the control core 146 is fully unsaturated, the next pulse in the winding 150 causes the inductance "L" to begin decreasing. A positive pulse of voltage appears across the winding 185 and is fed through the condenser 242 to fire the thyratron 216, and this immediately shifts the tuning back to the top of the broadcast band.

The pulse rate control circuit 188 includes a triode 244 with its plate 246 connected to the point 223 at the junction of the solenoid 172 and the resistor 222 and with its cathode 248 connected to the common ground circuit.

When the grid 250 is quite negative, the triode 244 is biased to cut off voltage and the circuit has no effect on the pulse rate. As the grid 250 becomes less negative, the triode 244 begins to conduct current from the terminal 218, thus reducing the voltage at the point 223 and delaying the rate of charging of the condenser 204 to delay the pulse rate.

When a high pass filter 190 and 192 is used, as shown, the higher oscillator frequencies, which are rectified by a rectifier 252 and appear across the resistor 254 shunted by a filter condenser 256 serve to bias the tube 244 to cut-off, thus increasing the pulse rate near the top of the broadcast band. When a low pass filter is used, the opposite effect takes place.

In order to increase the accuracy of tuning of the apparatus 16, the sharp tuning control circuit 194 is used. This includes a pair of diodes 252 in a discriminator circuit connected by the lead 196 to the output from the last tube of the I-F stage 26. The discriminator includes an air cored input transformer with a primary 254 tuned to the desired I-F frequency by a shunt condenser 256. The secondary 258 is tuned by the shunt condenser 260, and the center of the winding 258 is connected to the lead 196 by a coupling condenser 262. A radio frequency choke 264 connects the center tap of the secondary 258 to a pair of filter condensers 266 shunted by a pair of load resistors 268.

This discriminator is tuned to the desired I-F frequency of the receiver 108 and is arranged to have its maximum output when the actual I-F frequency differs from the desired frequency by the amount of station detuning caused by the strongest carrier signal. The direction of the output voltage in the leads 198 is such as to shift the magnetic condition of the control core 146 so as to drive the tuning toward dead center on the station.

FIGURE 6 shows the modified portions of a pulse generator 162a, which otherwise is identical with the generator 162. Components of the modified circuit which perform functions corresponding to these in the circuit of FIGURE 5 are indicated by the same reference numeral with a suffix "a." In this arrangement the pulses for the winding 150 are generated across a resistor 270 in series with the cathode of the thyratron 200a.

Referring again to FIGURE 3, the isolation of the signal flux in the cores 132 and 134 may be increased by the use of nonmagnetic electrically-conductive shims 272 between the legs 144 and the respective cores 132 and 134. These shims 272 may conveniently be made from copper foil. Also, shields of copper foil may be placed around the various signal windings 136 and 138 to provide further isolation from each other.

As used herein the expression "core means defining a flux path" is intended to include core structures having closed flux paths or flux loops substantially entirely defined by ferromagnetic or paramagnetic materials and also to include core structures having closed flux paths or flux loops of which portions are defined by ferromagnetic or paramagnetic materials and portions are defined by non-magnetic materials, for example, such as air, plastic, copper, aluminum, brass, etc.

As discussed above, it is preferable that the material in the signal and control core portions have characteristics which are related as described, with the control core portion having an effective retentivity and coercivity to maintain significant degrees of saturation of the signal core portion in the absence of any control current. A "square loop" ferrite having certain desirable characteristics to be included in the control core portion 146 is "Ferramic" MF 1118 made by the General Ceramics Corporation of Keasbey, New Jersey.

From the foregoing description it will be understood that the inductance control and apparatus and controllable inductors of the present invention are well adapted to provide the advantages described above and that the apparatus described may be used in a wide variety of applications and may include different modifications, each as may best suit the apparatus to particular applications and that various features of the invention may be used without a use of other corresponding features.

What is claimed is:

1. A controllable inductor comprising a core of ferromagnetic material having a yoke portion and a signal portion, said signal portion being formed of ferrite having a low value of retentivity, a signal winding carried by said signal portion, the effective inductance of said signal winding being controlled by the permeability of said signal portion, a control winding positioned to induce magnetic flux in said core, said yoke portion including magnetic material of higher retentivity than said signal portion and having sufficient magnetic retentivity to substantially saturate said signal portion and coercive force sufficient to maintain substantially saturating flux in said signal portion in the absence of any control current in said control winding.

2. A controllable inductor wherein changes of a control current through a control winding are used to vary the effective inductance of a signal winding in the presence of alternating-current signals and which is adapted to maintain various pre-set effective inductance values after the control current ceases comprising a signal core portion of saturable magnetic material, a signal winding electromagnetically coupled to said signal core, a control core portion including magnetic material of retentivity higher than that of the signal core portion and of coercivity higher than that of the signal core portion, said control core portion being magnetically linked to said signal core portion, a control winding electromagnetically coupled to said control core portion, the materials in said signal and control cores having magnetic characteristics so related that the negative plot of the normal magnetization curve of said saturable signal core material intersects a large B—H curve of said control core material near the knee of the demagnetization region of said B—H curve.

3. A controllable inductor adapted to be controlled by the application of a control current thereto and which can be permanently set to various desired levels of inductive reactance comprising a control core portion including magnetic material having a high retentivity, a signal core portion of magnetically saturable material extending between two spaced parts of said control core portion, said control core portion having a higher retentivity and a higher coercivity than said signal core portion, the retentivity of said control core portion when fully magnetized producing a substantial degree of saturation of said signal core portion, a signal winding on said signal core portion adapted to have an alternating current signal applied thereto, the inductive reactance of said winding being controlled by the degree of saturation of said signal core portion, and a control winding on said control core portion whereby the application of control current to said control winding sets the level of the permanent magnetization of said control core portion and thus sets the desired value of inductive reactance until the subsequent application of control current changes the level of permanent magnetization to a different value.

4. A controllable inductor having a control winding, control core means defining a control flux path, said control core means including retentive magnetic material having a high degree of retentivity, said control winding being electromagnetically coupled to said flux path whereby current in said control winding produces control flux changes in said control flux path for changing the level of permanent magnetization of said retentive material, a signal winding, signal core means defining a signal flux path, said signal core means being at least partially included in said control core means and including saturable magnetic material, said signal winding being electromagnetically coupled to said signal flux path, whereby changes in the effective permeability of said signal flux path affect the inductance of said signal winding, said retentive material in said control core means having a sufficiently high degree of magnetic retentivity to produce a substantial degree of saturation of any portions of said signal core means included in said control flux path whereby the application of control current to the control winding changes the level of permanent magnetization of said retentive material for changing the inductance of the signal winding, and the inductance of the signal winding remains at its set value without continuation of the control current, until the permanent magnetization of said retentive material is again changed by reapplication of control current.

5. Inductance control apparatus comprising a first core portion of saturable magnetic material, a signal winding on said first core portion adapted to have an alternating current signal applied thereto, a second core portion magnetically coupled to said first core portion, a control winding on said second core portion, said second core portion having sufficient effective retentivity and coercivity to hold said first core portion in a state of substantial saturation in the absence of any current in said control winding, and a source of electrical pulses coupled to said control winding.

6. A controllable inductor having a signal core portion and a control core portion, said signal core portion and control core porton defining a control flux path, a signal winding on said signal core portion and a control winding on said control core portion for regulating the flux in said control flux path, said signal core portion including magnetically "soft" ferrite, said control core portion including "square loop" ferrite, the negative plot of the normal magnetization curve of said magnetically "soft" ferrite material intersecting a large B—H curve of said "square loop" ferrite near the knee of the B—H curve in the demagnetization region thereof.

7. A controllable inductor including a first winding adapted to have an alternating current signal applied thereto, said first winding having magnetically permeable core material in magnetic flux coupled relationship therewith, a source of control flux for supplying magnetic flux to said signal core material for regulating the magnetic saturation thereof and thereby controlling the inductive reactance which said first winding presents to an applied alternating current signal, said source of control flux including magnetic control material of higher retentivity and higher coercivity than the signal core material, and a second winding in flux coupled relationship with said magnetic circuit, the magnetic characteristics of said signal core material and said control material being interrelated in the plot of relative flux density B in terms of relative magnetomotive force H, the negative plot of the normal magnetization curve of the signal core material intersecting a large magnetic hysteresis loop of the control material near the knee in the demagnetization region of said loop, whereby the second winding can be used to establish a desired level of permanent magnetism in said control material and said control material maintains a corresponding inductive reactance of the first winding after the control current ceases.

References Cited in the file of this patent

UNITED STATES PATENTS

| | | |
|---|---|---|
| 1,952,072 | Jewell | Mar. 27, 1934 |
| 2,059,393 | Polydoroff | Nov. 3, 1936 |
| 2,200,263 | Kromolin | May 14, 1940 |
| 2,302,893 | Roberts | Nov. 24, 1942 |
| 2,462,423 | Polydoroff | Feb. 22, 1949 |
| 2,685,653 | Orr et al. | Aug. 3, 1954 |
| 2,800,625 | Geroulo et al. | July 23, 1957 |
| 2,855,563 | William | Oct. 7, 1958 |

OTHER REFERENCES

Ser. No. 341,722, Weis et al. (A.P.C.), published May 18, 1943.